(12) United States Patent
Dugoni (10) Patent No.: US 12,207,715 B2
(45) Date of Patent: Jan. 28, 2025

(54) ELECTRONICS STORAGE SYSTEM

(71) Applicant: Yondr, Inc., San Fransisco, CA (US)

(72) Inventor: Graham Dugoni, San Francisco, CA (US)

(73) Assignee: YONDR, INC., San Francisco, CA (US)

( * ) Notice: Subject to any disclaimer, the term of this patent is extended or adjusted under 35 U.S.C. 154(b) by 197 days.

(21) Appl. No.: 17/560,188

(22) Filed: Dec. 22, 2021

(65) Prior Publication Data

US 2023/0189953 A1  Jun. 22, 2023

(51) Int. Cl.
| | | |
|---|---|---|
| *A45C 11/00* | (2006.01) | |
| *A45C 13/00* | (2006.01) | |
| *A45C 13/02* | (2006.01) | |
| *A45C 13/10* | (2006.01) | |

(52) U.S. Cl.
CPC ............ *A45C 11/00* (2013.01); *A45C 13/005* (2013.01); *A45C 13/02* (2013.01); *A45C 13/10* (2013.01); *A45C 2011/002* (2013.01); *A45C 2011/003* (2013.01); *A45C 2013/025* (2013.01)

(58) Field of Classification Search
CPC ........ A45C 2011/003; A45C 2011/002; A45C 2013/025; A45C 13/10; A45C 13/02; A45C 13/005; A45C 11/00
USPC .......... 206/320, 372, 373; 220/254.3, 254.1; 281/45
See application file for complete search history.

(56) References Cited

U.S. PATENT DOCUMENTS

| | | | | |
|---|---|---|---|---|
| 3,191,765 A | * | 6/1965 | Dozier ................... | A45D 44/18 206/207 |
| 3,417,897 A | * | 12/1968 | Johnson ............... | B65D 43/161 220/837 |
| 4,209,085 A | * | 6/1980 | Kozan .................... | A45C 13/02 273/287 |
| 4,768,651 A | * | 9/1988 | Lanius ................... | A01K 97/06 206/315.11 |
| 5,170,009 A | * | 12/1992 | Kadokura .............. | C09D 5/448 174/363 |
| 5,501,361 A | * | 3/1996 | DeMordaunt ...... | B65D 81/1275 206/523 |
| 5,529,174 A | * | 6/1996 | McQueeny .......... | B65D 5/5035 206/774 |
| 7,581,419 B2 | | 9/2009 | Belden, Jr. et al. | |

(Continued)

FOREIGN PATENT DOCUMENTS

GB           2479351 B        7/2012
KR        101088238 B1      11/2011

*Primary Examiner* — Chun Hoi Cheung (74) *Attorney, Agent, or Firm* — Nicholas Martin; Greenberg Traurig, LLP (57) ABSTRACT

An electronics storage device comprises an electrically conductive container and lid. A locking member may be disposed on a wall of the container and configured to engage with an engagement member disposed on an inside of the lid. When the lid is place on the container, electronic devices stored within the container may be shielded from electromagnetic signals, and the locking member may be engaged with the engagement member to further prevent physical access to the contents. A wall of the container may define a hole configured to receive charging cables and connectors therethrough, and means for organizing such cables and electronic devices within the container are contemplated.

14 Claims, 6 Drawing Sheets

(56) References Cited

U.S. PATENT DOCUMENTS

| | | | |
|---|---|---|---|
| 7,652,452 B2* | 1/2010 | Mori | H02J 7/0042 |
| | | | 174/53 |
| 7,891,220 B2 | 2/2011 | Yen et al. | |
| 7,891,495 B2* | 2/2011 | Nobles | A45C 13/00 |
| | | | 206/703 |
| 8,101,872 B2* | 1/2012 | Malone | H05K 9/0045 |
| | | | 174/382 |
| 8,207,849 B2 | 6/2012 | Belden, Jr. et al. | |
| 8,448,804 B2* | 5/2013 | Luburic | B65D 43/161 |
| | | | 215/254 |
| 9,002,288 B1 | 4/2015 | Reible | |
| 9,655,419 B2* | 5/2017 | Nash | H05K 9/0047 |
| 9,750,167 B2* | 8/2017 | Nash | H05K 9/0047 |
| 2003/0057131 A1* | 3/2003 | Diaferia | H05K 9/0049 |
| | | | 206/320 |
| 2008/0083768 A1* | 4/2008 | Luburic | B65D 47/0847 |
| | | | 220/810 |
| 2008/0190951 A1 | 8/2008 | Gallagher et al. | |
| 2010/0171465 A1* | 7/2010 | Seal | H02J 7/0044 |
| | | | 320/155 |
| 2011/0226785 A1* | 9/2011 | Sakell | A01K 97/20 |
| | | | 220/592.2 |
| 2014/0123715 A1 | 5/2014 | Bergum et al. | |
| 2014/0190841 A1 | 7/2014 | Nash | |
| 2016/0042202 A1* | 2/2016 | Murray | H04M 1/04 |
| | | | 320/108 |
| 2017/0270730 A1 | 9/2017 | Johnson et al. | |
| 2018/0327150 A1* | 11/2018 | Maldonado | B65D 77/208 |
| 2020/0005238 A1 | 1/2020 | Richardson et al. | |

\* cited by examiner

ELECTRONICS STORAGE SYSTEM

GOVERNMENT CONTRACT

Not applicable.

CROSS-REFERENCE TO RELATED APPLICATIONS

Not applicable.

STATEMENT RE. FEDERALLY SPONSORED RESEARCH/DEVELOPMENT

Not applicable.

COPYRIGHT & TRADEMARK NOTICES

A portion of the disclosure of this patent document may contain material which is subject to copyright protection. This patent document may show and/or describe matter which is or may become trade dress of the owner. The copyright and trade dress owner has no objection to the facsimile reproduction by any one of the patent document or the patent disclosure, as it appears in the Patent and Trademark Office patent files or records, but otherwise reserves all copyrights and trade dress rights whatsoever.

TECHNICAL FIELD

The disclosed subject matter relates generally to storage devices, and more particularly to systems configured to retain and prevent physical access to certain electronic devices.

BACKGROUND

The wide acceptance and use of mobile electronic devices, such as smartphones and tablet computers, has led to what many consider a screen-time addiction. More specifically, experts have suggested that the social stimuli provided by the use of mobile electronic devices, through messaging capabilities, social media, and other content available via countless software applications and the internet itself, cause the physiological release of a feel-good neurotransmitter—dopamine— which, in turn, causes a user to associate their smartphone and/or other computing devices themselves with the good feeling that dopamine produces. As a result, it has become increasingly common to find individuals reviewing the contents of or otherwise utilizing their mobile electronic devices while superficially engaged in each other's physical presence.

Many have proposed solutions to address the addictive qualities of electronic device(s). For instance, some digital solutions have been proposed. Certain downloadable software applications may be configured to prevent a user from accessing particularly addictive features on their electronic device(s) for a set period of time. That is, social media, gaming, and non-emergent communications applications, as well as the internet itself, may be electronically blocked by third-party applications. Other automatic "screen time limits" may be incorporated into the operating system of a user's electronic device and configured in a manner that renders a user's device inoperable or limited in operation during preselected times, in a certain geographic region, or under other conditions. Similarly, third-party and even native "parental controls" allow individuals other than the user themselves to set, define, or engage screen time limits and limits on the form and content of digital media accessible to the user from their electronic device(s). In any event, all of these proposals allow screen time to be limited while maintaining the user's possession of their electronic device(s). Indeed, this possession is the source of some of their deficiency: while in the possession of the user, many of these software-implemented screen time restrictions are relatively easy to override or circumvent.

Some have proposed solutions to entirely limit a user's physical access to their electronic device(s). Such proposals have been, generally, to equip containers configured to retain electronic devices, with external locking devices such as padlocks. For instance, U.S. Pat. No. 7,891,220 to Yen, et al. discloses a lockable box configured to inhibit movement of at least one contained article, such as a key, where the lock is detachable so as to permit locking articles to other than the box, such as a door handle. These, of course, fail to contemplate storage of larger useful items, such as personal electronic devices. U.S. Pat. Pub. No. 2014/0123715 by Bergum, et al. teaches a locking system in which various compartments in a storage container can be subject to various independent codes. That is, knowing the code to access one compartment in the storage container does not guarantee access to another. This locking system is not optimally configured to retain electronic devices, though.

Other lock boxes have been suggested to alarm when contents are accessed as a further deterrent such as in U.S. Pat. No. 8,207,849. However, these can be highly disruptive, and the long-term efficacy of using the shame as a deterrent to unwanted behavior is unclear.

Thus, although various proposals have been made to solve the problem of screen time addiction, none of those in existence combine the characteristics of the present invention. Therefore, there remains a need for an electronic storage system with the feature of the invention described herein.

SUMMARY

The present disclosure is directed to locking containers configured to limit physical access and, in some embodiments, electronic access to various personal electronic devices.

For purposes of summarizing, certain aspects, advantages, and novel features have been described. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested.

Broadly, the device comprises a locking, electrically conductive container and lid configured to retain at least one electronic device and optionally shield contents from electromagnetic fields. It is contemplated that the at least one electronic device may be any of a cell phone, smart phone, wrist watch, smart watch, tablet computer, laptop computer, remote control, or any other device as desired. For the sake of brevity, "electronic device" will refer to any and all of these possibilities and others contemplated. Indeed, as a locking storage container, it is contemplated that some users may wish and will be able to store other electronic or non-electronic personal effects inside as well. Thus, one of ordinary skill in the art will recognize that the invention will not be limited by its potential or actual contents.

In one embodiment, the container may comprise a base and a plurality of walls extending upward from the base to define an inside and an outside of the container as well as an opening through which the inside of the container is accessible. An inside surface of the base defines the container floor.

The lid of the electronics storage device may be configured to seal the opening in the container. In one embodiment, a locking member may be disposed on one of the plurality of container walls and configured to engage with an engaging member disposed on the inside of the lid. In some embodiments, the locking member may traverse one of the plurality of walls such that it may be engaged or disengaged as desired from the outside of the container. In an engaged position, the locking member may be secured to the engaging member and may prevent removal of the lid from the container so that electronic devices and other personal effects may be stored within and rendered irretrievable by engaging the lock.

In an embodiment, the engaging member may be a hook, flange, lip or other means for catching a latching portion of the lock and may be integrated or molded into the body of the lid itself.

It is contemplated that the lid may be formed as a single piece optionally fully removable from or otherwise hingedly attached to the container along an upper edge of one of the container walls. However, in some embodiments, the lid may be defined by a front portion and a back portion hingedly attached to one another. In some embodiments, the back portion may be formed as a recessed tray configured to receive one or more miscellaneous personal effects on an upper surface of the lid. That is, some personal effects may be stored on top of the electronics storage device and remain accessible to a user/owner as desired even while the locking member of the electronics storage device is engaged. Indeed, hingedly attaching the front and back portions of this embodiment of the lid may ensure that when the locking member is disengaged, any contents within the electronics storage device may be accessed without disturbing those items on the lid. In such embodiments, the engaging member may be disposed on an inside of the front portion of the lid. That is, the locking member may be disengageable from the engaging member and may allow the lid to be partially separable from the container in order to permit at least one electronic device to be positioned in or removed from the container.

In some embodiments, a tab may be disposed on an upper surface of the lid in order to aid removal of at least a portion of the lid from the container.

In one embodiment, the container and lid may comprise electrically conductive material such as metal. In another embodiment, the container and lid may comprise rugged wood, cardboard, fiber, or other materials and/or combinations of materials lined with metal or conductive mesh. It is contemplated that configuring the electronic storage device in this matter may entirely block or otherwise attenuate electromagnetic signals, including Wi-Fi, Bluetooth, Radio Frequency Identification (RFID), and Global Positioning System (GPS) signals either put forth from or directed at any electronic devices within the electronics storage device. It is contemplated that this will prevent external devices from interfering with or obtaining data from any electronic devices maintained within the container. This may give users peace of mind that data and other key signals may not be copied or digitally accessed while electronic devices containing such data remain physically remote or inaccessible to such users. As an example, this could prevent potential thieves from digitally copying passwords stored on an electronic device, or from learning the geographic location of the device and its user/owner. Indeed, additional elements may be provided in order to further prevent electromagnetic leakage. In some embodiments, this may be a conductive gasket disposed along an inner edge of the lid.

At least one of the container walls may define a hole configured to receive at least one elongated cable, such as cable for electrically charging any electronic device to be retained in the container. As such, the hole may be configured to also receive a connector disposed on a terminal end of the cable, which will be known to those of ordinary skill in the art. Thus, it is contemplated that any electronic devices maintained in the electronics storage device may have their batteries charged even if physically inaccessible to their users.

In an embodiment, a plug sized and configured to optionally seal any such hole may also be provided. In some embodiments, the plug may be configured to seal the hole from the inside of the container to prevent removal from the outside of the container while the container is closed and/or locked. It is contemplated that any plug may be magnetic for ease of use and/or storage within or on a wall of the container. In an embodiment, the plug may even be conductive itself to further seal the container from electromagnetic leakage. Still it is contemplated that the positioning and size of any hole defined by a wall of the container may be sized to attenuate electromagnetic signals as well.

In some embodiments, means for organizing electronic devices, personal effects, and even cables within the container may be provided as well. These may comprise spacers, dividers, false bottoms and other organizers as desired. In some embodiments, these may comprise rugged but soft materials to prevent damage to contents to any items stored within the device. For instance, means for organizing may comprise cardboard, soft plastics, silicone or even felted materials. In some embodiments, means for organizing may comprise resilient materials that are configured to receive items of various shapes and sizes.

It is contemplated that configuring an electronics storage device according to the disclosure and claims provided below may securely prevent unwarranted use of cell phones and tablet computers.

Thus, it is an object of the invention to physically prevent access to potentially addictive or otherwise disruptive features on certain electronic devices.

It is another object of the invention to block electromagnetic signals from entering or exiting the container to protect electronically data on any electronic devices held in storage.

It is another object of the invention to efficiently store devices within the container and provide means of organizing its contents.

One or more of the above-disclosed embodiments, in addition to certain alternatives, are provided in further detail below with reference to the attached figures. The disclosed subject matter is not, however, limited to any particular embodiment disclosed.

The disclosed embodiments may be better understood by referring to the figures in the attached drawings, as provided below. The attached figures are provided as non-limiting examples for providing an enabling description of the method and system claimed. Attention is called to the fact, however, that the appended drawings illustrate only typical embodiments of this invention and are therefore not to be considered as limiting of its scope. One skilled in the art will understand that the invention may be practiced without some of the details included in order to provide a thorough enabling description of such embodiments. Well-known structures and functions have not been shown or described in detail to avoid unnecessarily obscuring the description of the embodiments.

DETAILED DESCRIPTION

Having summarized various aspects of the present disclosure, reference will now be made in detail to that which is illustrated in the drawings. While the disclosure will be described in connection with these drawings, there is no intent to limit it to the embodiment or embodiments disclosed herein. Rather, the intent is to cover all alternatives, modifications and equivalents included within the spirit and scope of the disclosure as defined by the appended claims.

Figure 1A:
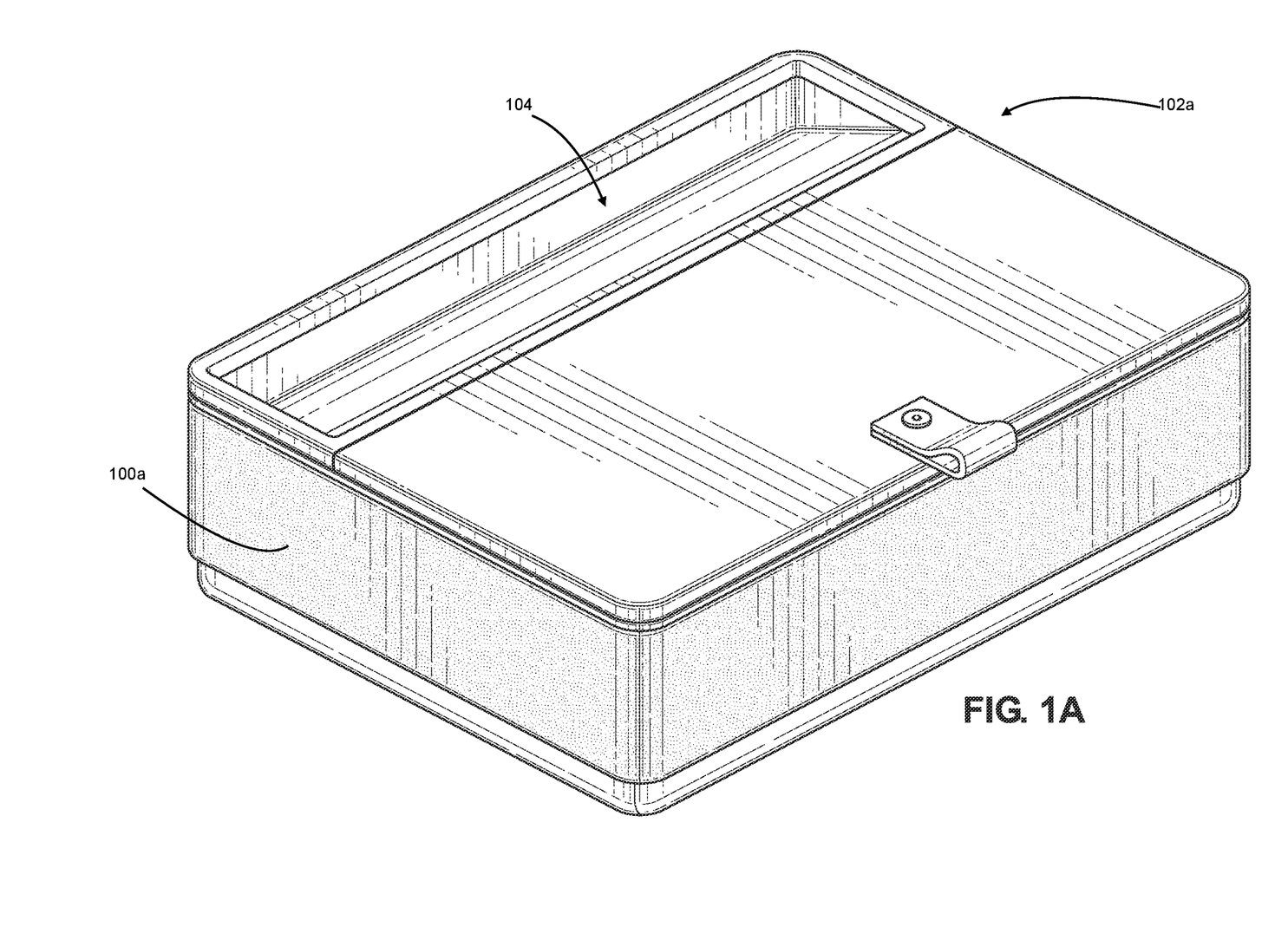
FIG. 1A shows a perspective view of one embodiment of the locking electronics tray.
Figure 1B:
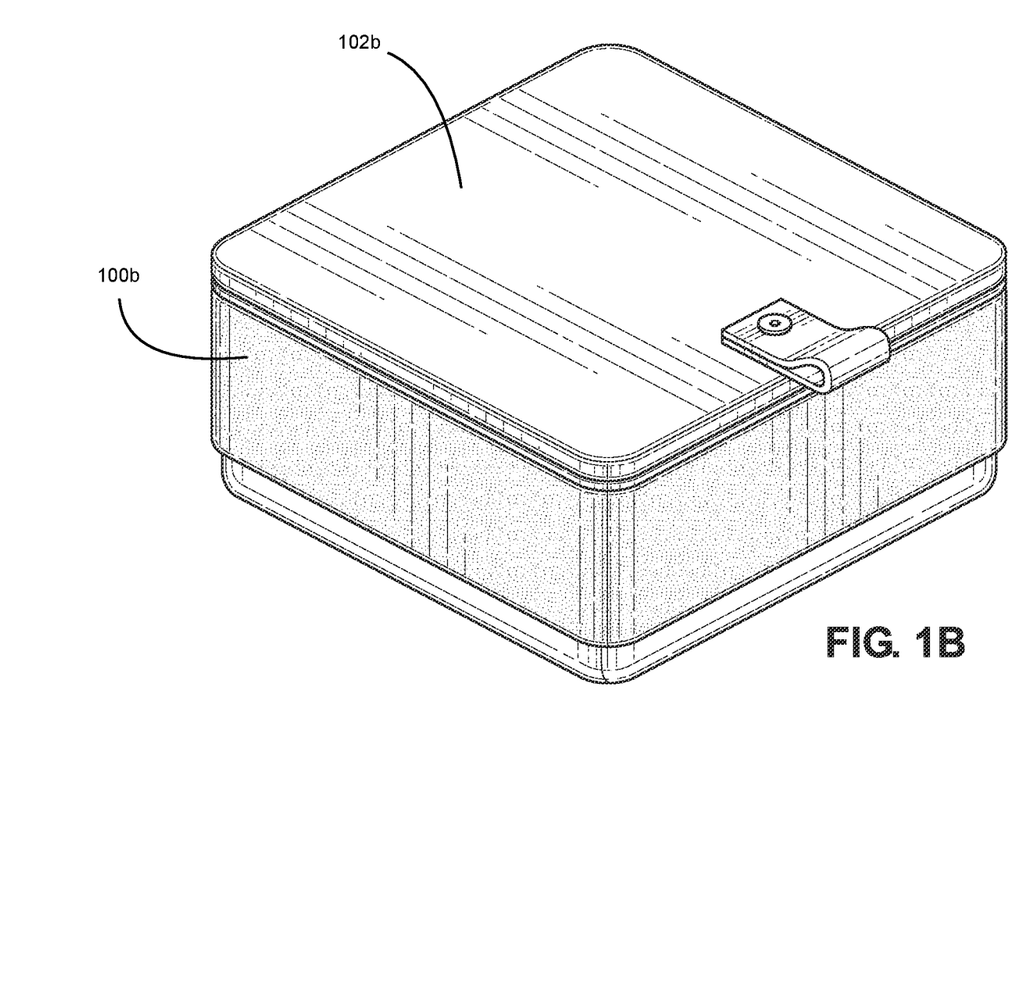
FIG. 1B shows a perspective view of another embodiment of the locking electronics tray.

FIGS. 1A and 1B illustrate exemplary alternative embodiments of the electronics storage device. In FIG. 1A, a container 100a is provided which is covered with a two-piece lid 102a defining a recessed tray 104, while FIG. 1B illustrates a container 100b which is covered with an undivided, flat lid 102b optionally fully removable from or otherwise hingedly attached to the container 100b. Each embodiment will comprise means for locking personal electronic devices and other effects within as well as optionally shield contents from electromagnetic fields, as discussed below.

Figure 2:
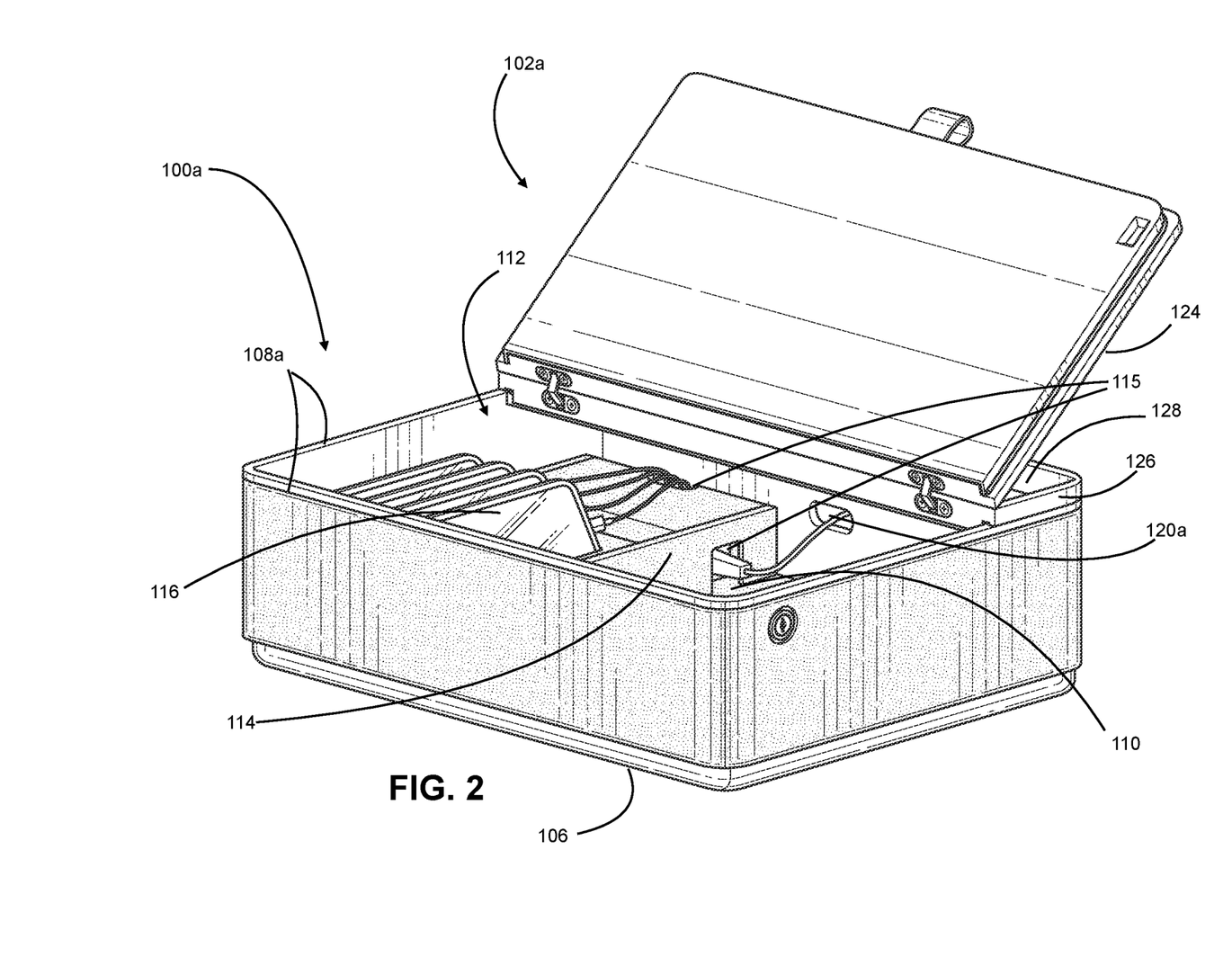
FIG. 2 shows an alternative perspective view of the locking electronics tray of FIG. 1A.

With reference to FIG. 2 the container 100a may comprise a base 106 and a plurality of walls 108 extending upward from the base 106 to define an inside and an outside of the container 100a as well as an opening 112 through which the inside of the container 100a is accessible. An inside surface of the base defines the container floor 110.

Means for organizing contents within the container 100a may be provided. In the exemplary embodiment, such means comprises a slotted divider 114. In some embodiments, slots may be provided to accommodate up to about ten (10) smart phones. In the exemplary embodiment provided, the means for organizing comprises enough slots to accommodate at least four smart phones 116, or other similarly configured devices. In one embodiment, additional space may be preserved adjacent to the divider 114 or other means for organizing such that a larger or differently shaped electronic devices or personal effects may be stored within the container 100a as well. In some embodiments, the means for organizing contents may be configured to conceal certain contents. For example, a means for organizing may be configured as a false bottom to conceal certain items. As another example, the means for organizing may define one or more notches 115 configured to receive cables and/or connectors therethrough and maintain such cables and/or connectors in an organized, partially concealed manner.

Figure 3:
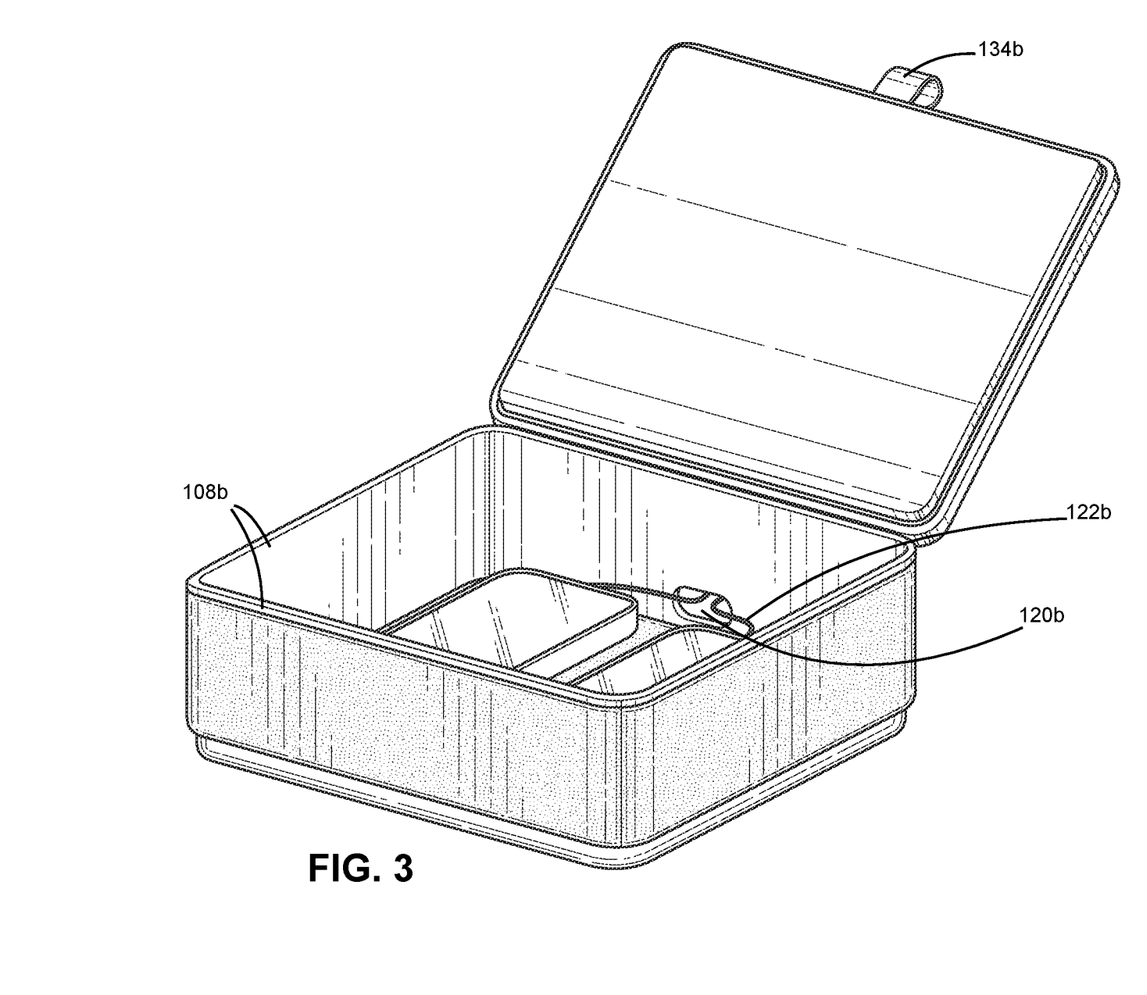
FIG. 3 shows an alternative perspective view of the locking electronics tray of FIG. 1B.

In some embodiments, such as that shown in FIG. 3, a plurality of electronic devices, or other personal effects, may be stored in the container 100b without any dividers or other means for organizing contents. Still, in both FIGS. 2 and 3, it may be seen that at least one of the container walls 108a and 108b, respectively, may define a hole 120a, 120b configured to receive at least one elongated cable 122a, 122b, such as cable for electrically charging any electronic device to be retained in the container 100a, 100b. As such, the hole 120a, 120b may be configured to also receive a connector (not pictured) disposed on a terminal end of the cable, such as a USB, lighting, or any other connector, which will be known to those of ordinary skill in the art. Thus, it is contemplated that any electronic devices maintained in an embodiment of the electronics storage device may have their batteries charged even if physically inaccessible to their users.

The electronics storage device may be sized to receive a plurality of electronics devices and personal effects, including different types and sizes of such devices and effects. In an embodiment, the container 100a, 100b may be about 75 mm to about 110 mm high to accommodate the height and/or width of fully or partially upstanding or stacked personal electronic devices. In some embodiments, the electronics storage device may be about 150 mm to about 290 mm deep to accommodate devices of different sizes. In some embodiments, the electronics storage device may be about 280 mm to about 290 mm deep to allow removal of a stored electronic device without fully removing the lid 102a, 102b from the container.

Figure 4:
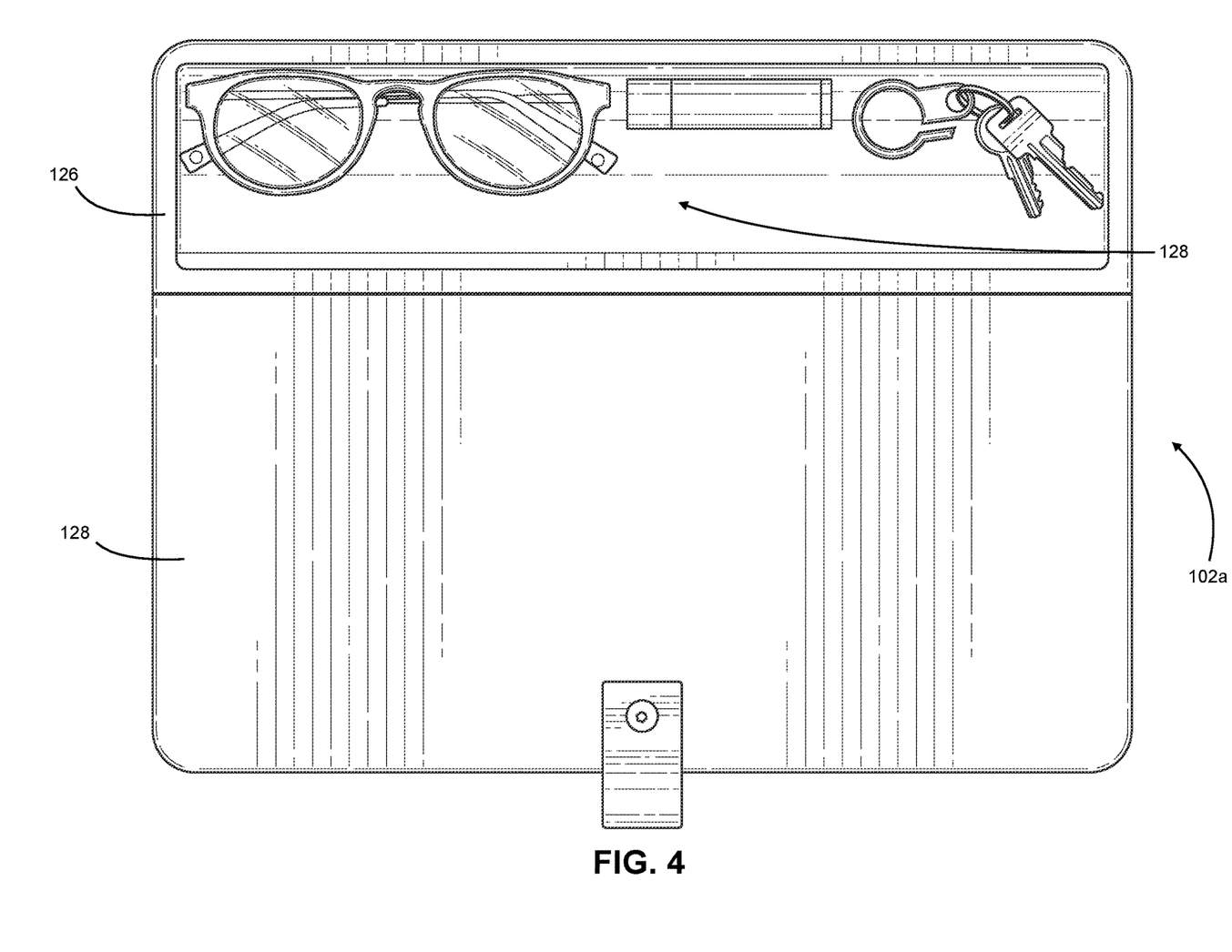
FIG. 4 shows a perspective view of the locking electronics tray of FIG. 1A.

Returning to FIG. 2, in some embodiments, the lid may be defined by a front portion 124 and a back portion 126 hingedly attached to one another. In some embodiments, the back portion may be formed as a recessed tray 128 configured to receive one or more miscellaneous personal effects on an upper surface of the lid, as shown more clearly in FIG. 4. That is, some personal effects may be stored on top of the electronics storage device and remain accessible to a user/owner as desired even while the locking member of the electronics storage device is engaged. Indeed, hingedly attaching the front and back portions 124, 126 of this embodiment of the lid 102a may ensure that when the locking member is disengaged, any contents within the electronics storage device may be accessed without disturbing those items on the lid. In some embodiments, the recessed tray 128 may be formed to avoid interference with items stored in the container. For instance, in one embodiment, the recessed tray 128 may angled or otherwise formed such that a deepest portion of the tray is immediately adjacent to a rearmost wall of the container (concealed from view at this angle). In such embodiments, a larger vertical space may be occupied within the container than otherwise possible if the recessed tray 128 maintained a consistent depth throughout.

Figure 5:
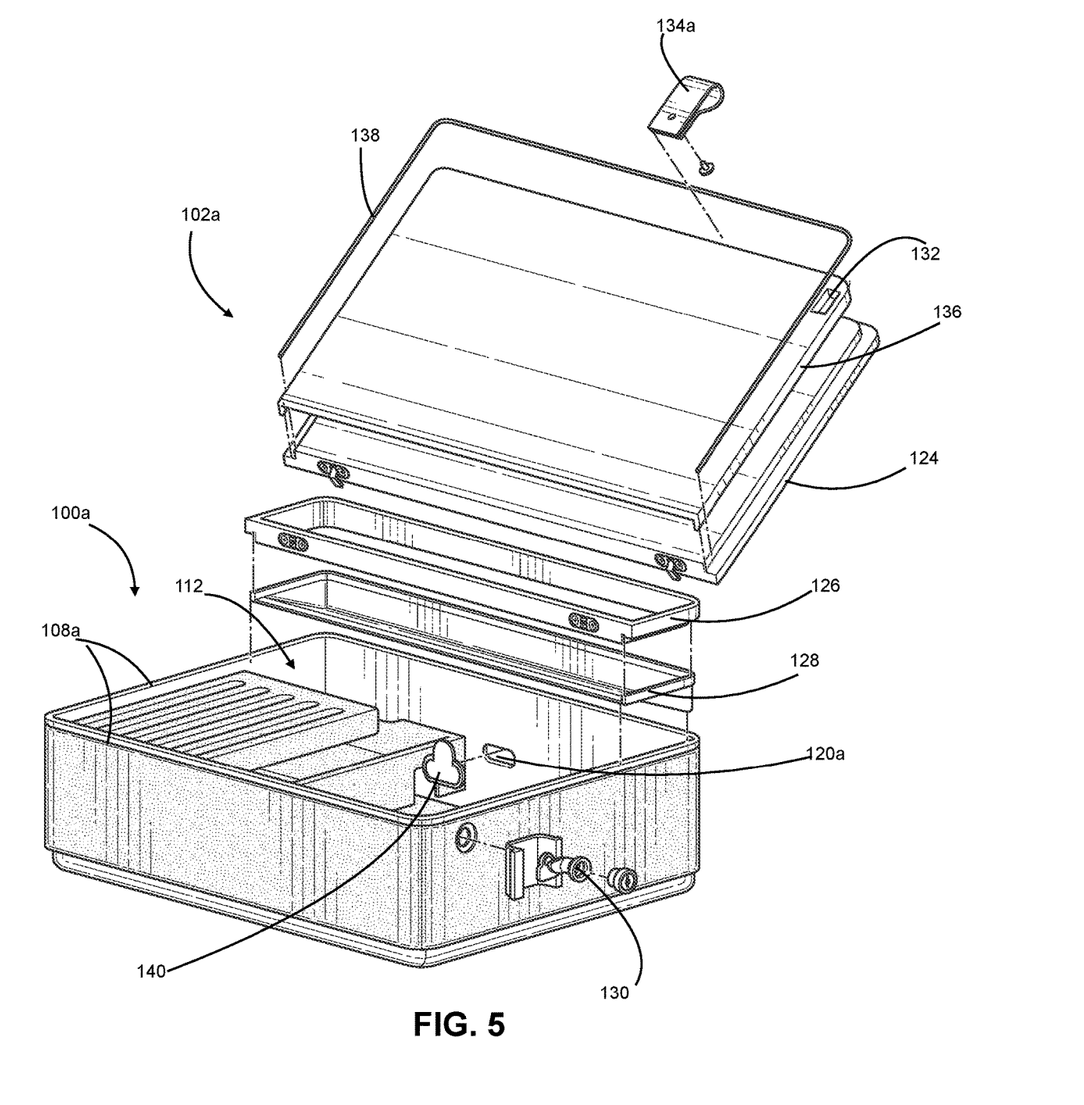
FIG. 5 shows an exploded view of the locking electronics tray of FIG. 1A.

Turning now to FIG. 5, an exemplary lid 102a of the electronics storage device may be configured engage with a locking member 130 to prevent access to the opening 112 of the container 100a. An exploded view shows this in more detail. In one embodiment, the locking member 130 may be disposed on one of the plurality of container walls 108a and configured to engage with an engaging member 132 disposed on the inside of the exemplary lid 102a. In some embodiments, the locking member 130 may traverse one of the plurality of walls 108a such that it may be engaged or disengaged as desired from the outside of the container 100a. In an engaged position, the locking member 130 may be secured to the engaging member 132 and may prevent removal of the lid 102a from the container 100a so that any electronic devices and other personal effects may be stored within and rendered irretrievable by engaging the locking member 130.

In an embodiment, the engaging member 132 may be a hook, flange, lip or other means for catching a latching portion of the locking member 130 and may be integrated or molded into the body of the lid itself.

In embodiments in which the lid 102a comprises a front portion 124 and a back portion 126, the engaging member 132 may be disposed on an inside of the front portion 124 of the lid 102a. That is, the locking member 130 may be disengageable from the engaging member 132 and may allow the lid 102a to be partially separable from the container in order to permit at least one electronic device to be positioned in or removed from the container while avoiding fully removing the lid 102a and disturbing any personal effects stored in the recessed tray 128. A tab 134a may be disposed on an upper surface of the lid 102a in order to aid removal of at least a portion of the lid 102a from the container 100a. A similar tab 134b is shown in FIG. 3.

Returning to FIG. 5, in one embodiment, the container 100a and lid 102a may comprise electrically conductive material such as metal. In another embodiment, the container and lid may comprise rugged wood, cardboard, fiber, or other materials and/or combinations of materials in addition to sheet metal lining 136, shown in the exploded view, or even conductive mesh. It is contemplated that configuring the electronic storage device in this matter may entirely block or otherwise attenuate electromagnetic signals, including Wi-Fi, Bluetooth, Radio Frequency Identification (RFID), and Global Positioning System (GPS) signals either put forth from or directed at any electronic devices within the electronics storage device. It is contemplated that this will prevent external devices from interfering with or obtaining data from any electronic devices maintained within the container.

Additional elements may be provided in order to further prevent electromagnetic leakage. In some embodiments, this may be a conductive gasket 138 disposed along an inner edge of the lid 102a. In some embodiments, this may be a plug 140 sized and configured to optionally seal any hole 120a in the walls 108a of the container 100a. In some embodiments, the plug 140 may be configured to seal the hole 120a from the inside of the container 100a to prevent its removal from the outside of the container while the container is closed and/or locked. It is contemplated that any plug 140 may be magnetic for ease of use and/or storage within or on a wall 108a of the container 100a. In an embodiment, the plug 140 may even be conductive itself to further seal the container from electromagnetic leakage. Still it is contemplated that the positioning and size of any hole 140 defined by a wall of the container may be sized to attenuate electromagnetic signals as well.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

CONCLUSIONS, RAMIFICATIONS, AND SCOPE

While certain embodiments of the invention have been illustrated and described, various modifications are contemplated and can be made without departing from the spirit and scope of the invention. For example, the electrically conductive material comprising the container and lid may vary depending on the particular degree of electromagnetic or radio frequency interference attenuation desired. Additionally, the color and type of covering provided on the outside of the tray and even the particular material defining the outer surface of the lid may vary depending on the tastes of the user. Accordingly, it is intended that the invention not be limited, except as by the appended claim(s).

The teachings disclosed herein may be applied to other systems, and may not necessarily be limited to any described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions and concepts of the various references described above to provide yet further embodiments of the invention.

Particular terminology used when describing certain features or aspects of the invention should not be taken to imply that the terminology is being refined herein to be restricted to any specific characteristics, features, or aspects of the electronics storage device with which that terminology is associated. In general, the terms used in the following claims should not be constructed to limit the electronics storage device to the specific embodiments disclosed in the specification unless the above description section explicitly define such terms. Accordingly, the actual scope encompasses not only the disclosed embodiments, but also all equivalent ways of practicing or implementing the disclosed system, method and apparatus. The above description of embodiments of the electronics storage device is not intended to be exhaustive or limited to the precise form disclosed above or to a particular field of usage.

While specific embodiments of, and examples for, the method, system, and apparatus are described above for illustrative purposes, various equivalent modifications are possible for which those skilled in the relevant art will recognize.

While certain aspects of the method and system disclosed are presented below in particular claim forms, various aspects of the method, system, and apparatus are contemplated in any number of claim forms. Thus, the inventor reserves the right to add additional claims after filing the application to pursue such additional claim forms for other aspects of the electronics storage device.

What is claimed is:

1. A device comprising:
   a container configured to retain the at least one electronic device, the container comprising a plurality of walls extending upward from a base to define an inside and an outside of the container, the container further comprising a front portion and a rear portion defined by at least a portion of the walls;
   a lid configured to shield the at least one electronic device from electromagnetic signals, the lid being attached to the rear portion of the container, wherein the container is further configured to shield the at least one electronic device from the electromagnetic signals;
a recessed tray configured to receive one or more items, the recessed tray being accessible via an opening in the lid so as to enable input of the one or more items within the device and between the lid and the rear portion of the container, the opening of the lid being partially separable from the lid; and
a lock disposed on the lid for engagement with a portion of the container to lock the device,
wherein, in an engaged position, the lock prevents removal of the at least one electronic device from within the device.

2. The device of claim 1, wherein the container comprises a coated metal.

3. The device of claim 1, wherein the device comprises a metal lining.

4. The device of claim 1, wherein the front portion of the container comprises a larger area of the container than the rear portion of the container.

5. The device of claim 4, wherein the recessed tray is angled such that a deepest portion of the recessed tray extends below a top of a least one of the plurality of walls.

6. The device of claim 1, further comprising an organizer.

7. The device of claim 6, wherein the organizer comprises a false bottom insert configured to raise a bottom of the container and define a space between a container floor and an underside of the false bottom insert.

8. The device of claim 7, wherein the false bottom insert is configured to define a platform above at least one hole in at least one of the plurality of walls such that any elongated cables received therethrough are maintained below the false bottom insert.

9. The device of claim 7, wherein the false bottom insert comprises felt.

10. The device of claim 6, wherein the organizer comprises a divider configured to retain a plurality of electronic devices within the container in an at least partially up standing position.

11. The device of claim 1, further comprising:
a plug configured to further seal the container from electromagnetic leakage.

12. The device of claim 11, wherein removal of the plug from the container is prevented while the container is closed or locked and the plug seals a hole from the inside of the container.

13. The device of claim 11, wherein the plug is conductive.

14. The device of claim 11, wherein the plug is magnetic.

* * * * *